US008929405B2

(12) United States Patent
Ruffini et al.

(10) Patent No.: US 8,929,405 B2
(45) Date of Patent: Jan. 6, 2015

(54) METHOD AND APPARATUS FOR OPTIMIZING PACKET TIMING TRANSPORT

(75) Inventors: Stefano Ruffini, Rome (IT); Raoul Fiorone, Genoa (IT); Orazio Toscano, Genoa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 239 days.

(21) Appl. No.: 13/503,681

(22) PCT Filed: Oct. 29, 2009

(86) PCT No.: PCT/EP2009/064270
§ 371 (c)(1),
(2), (4) Date: Sep. 5, 2012

(87) PCT Pub. No.: WO2011/050844
PCT Pub. Date: May 5, 2011

(65) Prior Publication Data
US 2013/0010813 A1     Jan. 10, 2013

(51) Int. Cl.
*H04J 3/06* (2006.01)
(52) U.S. Cl.
CPC .............. *H04J 3/0697* (2013.01); *H04J 3/0664* (2013.01); *H04J 3/0673* (2013.01)
USPC ...... 370/503; 370/350; 370/395.62; 370/324; 370/504

(58) Field of Classification Search
USPC ............ 370/503, 350, 395.62, 324, 304, 301, 370/508, 504, 510, 520, 511–514
See application file for complete search history.

(56) References Cited

U.S. PATENT DOCUMENTS

| | | | | |
|---|---|---|---|---|
| 6,445,707 B1* | 9/2002 | Iuoras et al. | ............. | 370/395.43 |
| 2004/0153716 A1* | 8/2004 | Baker | ............. | 714/4 |
| 2006/0165091 A1* | 7/2006 | Arima et al. | ............. | 370/395.21 |
| 2008/0181112 A1 | 7/2008 | Beck et al. | | |
| 2010/0290572 A1* | 11/2010 | Garner et al. | ............. | 375/356 |

FOREIGN PATENT DOCUMENTS

| | | |
|---|---|---|
| EP | 1 715 607 A1 | 10/2006 |
| WO | 01/95550 A2 | 12/2001 |

OTHER PUBLICATIONS

PCT Search Report, mailed Jun. 16, 2010, in connection with International Application No. PCT/EP2009/064270.

(Continued)

*Primary Examiner* — Kibrom T Hailu
*Assistant Examiner* — Zewdu A Beyen
(74) *Attorney, Agent, or Firm* — Leffler Intellectual Property Law, PLLC

(57) ABSTRACT

There is provided a method of optimizing timing packet transport in a network node, the method comprising using a locally available stable frequency reference at the network node to provide a pre-determined network node transit time for timing packets in at least one direction into or out of the network node. There is also provided a network node comprising a locally available stable frequency reference and circuitry adapted to apply a pre-determined network node transit time, L, to all timing packets transiting the network node in at least one direction into or out of a network node dependent on the locally available stable frequency reference.

15 Claims, 6 Drawing Sheets

(56) References Cited

OTHER PUBLICATIONS

ITU-T Recommendation G.8261/Y.1361, "Series G: Transmission Systems and Media, Digital Systems and Networks, Packet over Transport aspects—Quality and availability targets; Series Y: Global Information Infrastructure, Internet Protocol Aspects and Next-Generation Networks, Internet protocol aspects—Transport, Timing and synchronization aspects in packet networks", Apr. 2008.

IEEE Standard 1588-2008 IEEE Standard for a Precision Clock Synchronization Protocol for Networked Measurement and Control Systems, IEEE Instrumentation and Measurement Society, IEEE, Jul. 24, 2008.

* cited by examiner

METHOD AND APPARATUS FOR OPTIMIZING PACKET TIMING TRANSPORT

TECHNICAL FIELD

The invention is related to networking in general, and in particular to an improved packet timing transport mechanism.

BACKGROUND

There are a number of network applications requiring accurate frequency and/or time synchronization references in order to operate properly, for example mobile communication technologies such as Global System for Mobile Communications (GSM), Wideband Code Division Multiple Access (WCDMA) and Long Term Evolution (LTE).

The traditional timing solution is for the network nodes to synchronize their local clocks from the synchronous stream of data used to connect the network nodes together, as for instance in case of Time Division Multiplexing (TDM) based networks, but the migration of networks from TDM to cheaper packet based technologies (such as Ethernet) requires a different approach. In such a packet based network, the data from a first end node to a second end node (e.g. from a caller's base station to a call receiver's base station) typically follows a path comprising a number of hops between a set of intermediate nodes.

One solution for a packet based topology is to use a packet based method, where the timing information is carried across a packet network by sending packets containing timestamp information, i.e. timing packets. The timestamps are generated by a master (server) that has access to an accurate reference, such as a Global Positioning System (GPS) based clock.

FIG. 1 shows an exemplary timing packet-based method of distributing synchronization, where a time server 110 sends timing packets 115 out across the packet network 120, interspersed between data packets 125, to a receiving node 130, which recovers the timing information 135 from the timing packets, for use in adjusting the local clock, and the like.

Each receiving node 130 can run an algorithm that recovers the timing information 135 based on adaptive clock recovery methods, e.g. by comparing the local timing with the arrival and/or inter-arrival times of the packets (for example, as described in the standard ITU-T G.8261). The accuracy of the recovered timing information 135 is therefore affected by variable delays in the packet network 120, and one of the key requirements of the timing information recovery algorithm is to filter out the packet delay variation (PDV).

When time synchronization is requested, a two-way timing protocol is mandatory, for example Network Timing Protocol (NTP) or Precision Timing Protocol (PTP), in which the transfer delay from master to slave is calculated.

One possible approach to network synchronisation in packet networks is to add timing support in the network nodes between the Master and the Slave. In the case of PTP, these functions are the Boundary Clocks (BC) and Transparent Clocks (TC), as described in the Institute of Electrical & Electronics Engineers standard, IEEE 1588.

FIG. 2 shows a packet-based mobile communications network including such timing support. The timing support concerns adding hardware, as well as software, functions in the intermediate network nodes (for example, Ethernet switches or routers). For example, a PTP grandmaster clock node 110 provides timing packets 115 to a base station 210, via a number of hops between network nodes (e.g. via boundary clock 111) that can process the timing packets so as to improve the overall performance of the packet based synchronisation method.

In this example the transparent clock provides a means of measuring the delay that has been added by the respective network node, and of measuring the delays on links connected to that network node. The end-equipment can use this information to recover the time reference. The boundary clock, by contrast, terminates and regenerates timestamp packets, so that internal queuing delays are reduced.

However, there are issues arising from these two new functions, Boundary Clocks and Transparent, which include:

The new functions generally require significant architectural changes.

The implementation of the Transparent Clock type of function is especially considered critical mainly due to the fact it creates a network layer violation.

The Transparent Clock in particular can also lead to security issues, as packets are modified even if not terminated in the network node, which typically means that the use of Transparent Clocks in Telecoms applications may not be accepted.

The use of Boundary Clocks in a multi-operator environment, for example where two mobile networks share radio network infrastructure, is also problematic.

Accordingly, it would be desirable to provide and improved network node apparatus and methods which reduce the packet delay variation and the impact of asymmetry in packet based networks.

Another fundamental aspect is the generation of accurate time stamps. Traditionally, the accurate generation of time stamps is achieved either via a two-step clock approach (e.g. PTP Follow-up message) or via hardware time-stamping (i.e. the timestamp is generated by the network node at the physical layer just before the packet leaves the master, and not by software implemented in networking layers higher up the networking protocol stack).

It would also be desirable to provide accurate, yet simplified approach to generation of the time stamps from a Master clock network node.

SUMMARY

Accordingly, there is provided a method of optimising timing packet transport in a network node, the method comprising using a locally available stable frequency reference at the network node to provide a pre-determined network node transit time for timing packets in at least one direction into or out of the network node.

Optionally, the method further comprises detecting an arrival time, t1, for a received timing packet, and forwarding the received timing packet to an output port of the network node at a transmission time, t2, the transmission time t2 being a predetermined duration, L, after the arrival time t1.

Optionally, the method further comprises receiving and storing the timing packet at an output queue following processing of the timing packet by the network node.

Optionally, the method further comprises selecting a highest priority output queue of the network node to transmit timing packets.

Optionally, the method further comprises providing a pre-determined network node transit time for timing packets in both directions into and out of the network node.

Optionally, the method further comprises detecting a size of a data packet scheduled to be transmitted on a same output port as the timing packet, and delaying the transmission of the data packet if the size of the data packet indicates that transmitting the data packet would delay the transmission of the timing packet at the transmission time t2.

Optionally, the method further comprises determining whether any one or more other data packets available for transmission on the same output port has a size small enough to be transmitted within a remaining time before the transmission time t2 of the timing packet, and transmitting the one or more other data packets.

Optionally, the locally available stable frequency reference is an external synchronization reference provided to the network node and operable to provide a global clock frequency, or a stable local oscillator.

Optionally, the network node is in a network of nodes, wherein each network node is operable to transmit data to another network node or receive data from another network node, and wherein timing packets are transmitted from a first network node to a second network node via a path comprising hops between connected network nodes, and wherein the pre-determined network node transit time, L, is chosen such that a time to transmit a timing packet from a first network node to the second network node is within a predetermined time budget, said time budget being dependent upon a particular application of communication within the network of nodes.

Optionally, the pre-determined network node transit time, L, is determined by a worst case scenario of a network node transit time for the particular network node in the path in either direction between first and second network nodes, said worst case scenario determined by a priori knowledge of the network node characteristics or during an initial communication between the first and second network nodes along a path to be used in subsequent communication between the first and second network nodes.

There is also provided a network node comprising a locally available stable frequency reference, and circuitry adapted to apply a pre-determined network node transit time, L, to all timing packets transiting the network node in at least one direction into or out of a network node dependent on the locally available stable frequency reference.

Optionally, the circuitry further comprises input circuitry comprising at least one local timer in communication with the locally available stable frequency reference and adapted to register an input time, t1, for a received timing packet, output circuitry comprising at least one local timer in communication with the locally available stable frequency reference and adapted to output the timing packet to an output port at time t2, determined by applying a predetermined duration, L, to the registered input time, t1.

Optionally, the network node further comprises an input buffer, and the output circuitry further comprises an output queue, and the input buffer and output queue are collectively arranged to store the timing packet for the predetermined duration of time, L.

Optionally, the network node further comprises data packet size detection circuitry adapted to detect a size of a next data packet to be transmitted out of the output port to determine whether the next data packet can be transmitted in full before the predetermined period of time, L, has expired, and a scheduler unit adapted to schedule the transmission of the data packet after the transmission of the timing packet if the data packet cannot be transmitted in full before the predetermined period of time, L, has expired. This is to say, in case of a timing packet crossing the node, since it is "known" L ms in advance when the timing packet is to be sent out, this "L" period can be used to properly schedule both the timing and data packets on the output line card.

Optionally, the data packet size detection circuitry is further adapted to detect a size of any other data packet ready for transmission from the output port to determine whether any other data packet can be transmitted in full before the predetermined period of time, L, has expired, and the scheduler unit adapted to schedule the transmission of the any other data packet before the transmission of the timing packet if the determined size of any other data packet indicates the any other data packet can be transmitted in full before the predetermined period of time, L, has expired.

Optionally, the network node further comprises a timing packet generator adapted to generate timing packets from the locally available stable frequency reference, and the network node comprises a master clock network node.

Optionally, the output queue is a highest priority output queue.

Optionally, the locally available stable frequency reference is an external synchronization reference provided to the network node and operable to provide a global clock frequency, or a stable local oscillator.

Optionally, the circuitry is further adapted to apply a pre-determined network node transit time in both directions into and out of the network node.

There is also provided a method of optimising timing packet transport in a network node, the method comprising using a locally available stable frequency reference at a network node to control the timing packet delay variation across the network node.

It will be appreciated that in the case of the network node being a time generating device, the delay variation is not strictly across the node, but within the node—i.e. from the point of internal timing packet generation until its output from the node.

It will be appreciated that the term 'fixed network transit time' encompasses all times within a range determined by the accuracy of the timing hardware. i.e. the physics of devices mean that they do not react instantly, and hence variation in the actual length of the fixed transit time will occur (but the difference will only be very very small indeed—in the order of nano seconds).

Optionally, control of the timing packet events occurs in a physical layer of the network node.

There is also provided a network node comprising a locally available stable frequency reference, and at least one local timer synchronised to the locally available stable frequency reference, said local timer adapted to control the packet delay variation of packets transmitted across the network node.

There is also provided a computer-readable medium, carrying instructions, which, when executed, causes computer logic to carry out any of the described method.

By delaying the timing packets with a fixed delay, a relatively fixed network node transit time (i.e. such that the network node can be represented as a fixed length delay) is provided, which ensures that all timing packets transiting a network of nodes according to embodiments of the invention do so in a consistent way. This is to say, the packets are not just being sent as and when they can be, according to the workload of the particular network node.

Furthermore, by providing the same fixed length delay (i.e. network node transit time) in both directions, asymmetry in the network is removed.

A two-way timing protocol may also be used to make the frequency synchronization distribution more robust, where both master to slave and slave to master timing packets are used to recover the master timing reference.

An advantage of embodiments according to the present invention is that the complex and costly part of the timing support for packet based methods can be significantly reduced, at least in some nodes, by implementing a simplified support approach, able to guarantee the required degree of quality in the overall timing packet distribution.

The simplified timing support utilized by embodiments of the invention would typically be used by metro/core systems, including routers, carrier Ethernet switches and packet optical transport platforms, which are already devoted to high capacity and complex functionality. Furthermore, embodiments of the invention do not require any significant architectural change or hardware modification of existing equipment, thus allowing a smoother and cost effective upgrade to more sophisticated and high performance timing functionality at network level.

Embodiments of the present invention do not provide alternatives to an IEEE1588 or any other standard packet based solution. Instead embodiments provide complementary Network and Node level solutions, fully compliant with a IEEE1588 or any other standard packet based solution. For example, a combination of embodiments as presented herein with traditional IEEE1588 clocks (or any other similar function based on different protocol) is particularly interesting in case of multi-operator environment. A combination of these features and IEEE1588 clocks would allow delivery of high accuracy also when interworking between operators occur.

Finally, embodiments of the present invention take advantage of existing technology, like SyncE and legacy synchronization networks, and the characteristics of packet based time synchronization methods and their timing requirements (of the particular application being used over the network), to realize a tailored timing solution having a minimum network impact and cost.

BRIEF DESCRIPTION OF THE DRAWINGS

A method for optimising packet timing transport in a network, and associated implementing hardware, will now be described, by way of example only, and with reference to the accompanying drawings in which.

DETAILED DESCRIPTION

Figure 1:
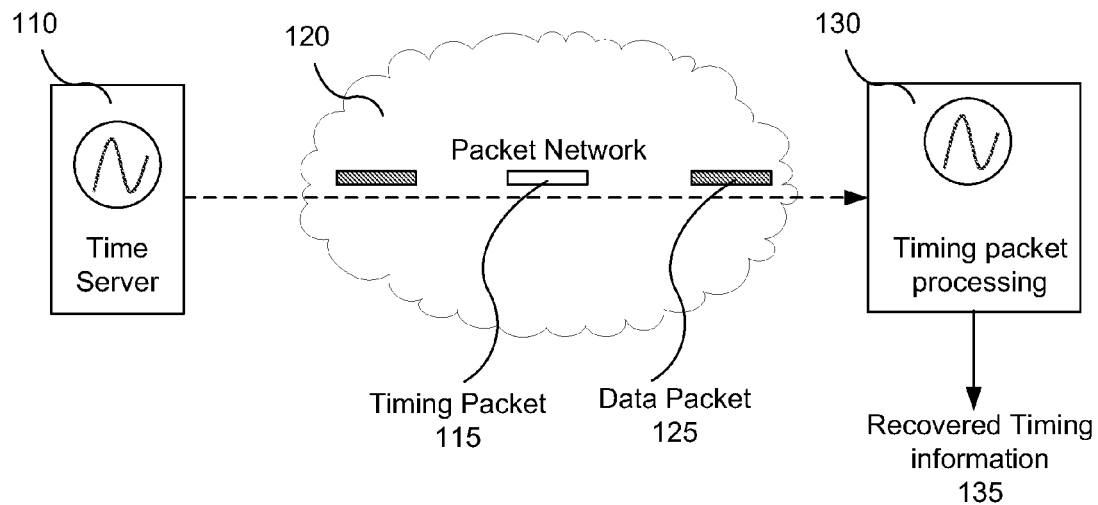
FIG. 1 shows a packet-based method of distributing timing synchronization between network nodes.
Figure 2:
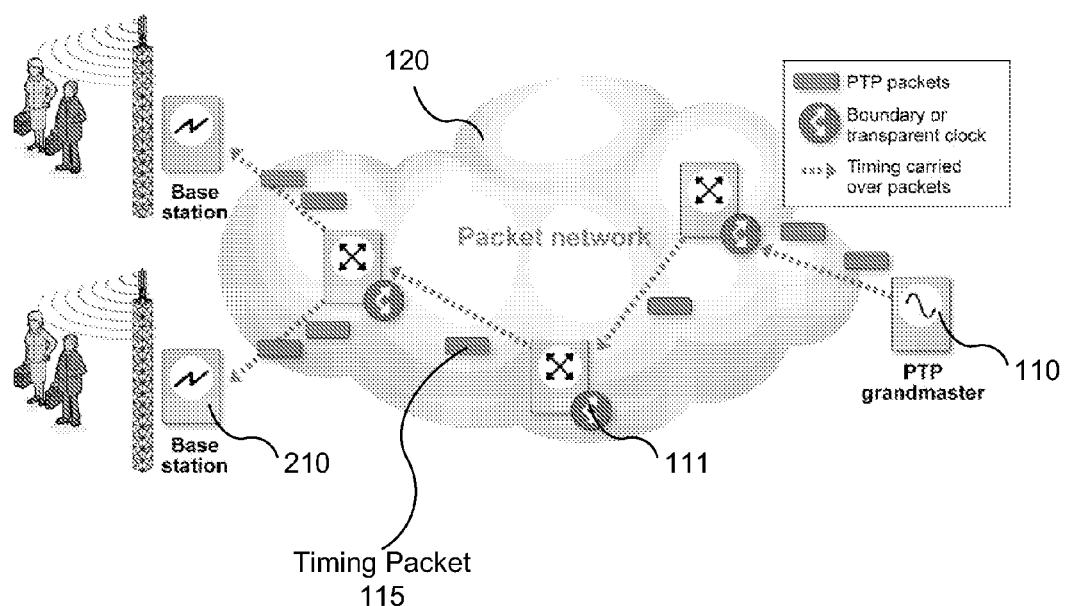
FIG. 2 shows a packet-based method of distributing timing synchronization between network nodes including timing support from the network.

An embodiment of the invention will now be described with reference to the accompanying drawings in which the same or similar parts or steps have been given the same or similar reference numerals.

The following description is applicable to either the time (phase) synchronization applications or frequency synchronization applications (or both).

In case of time (phase) synchronization one fundamental assumption is that the delay from master to slave and from slave to master shall be identical.

This means that any asymmetry in the packet network would significantly impact the performance of the delivered time synchronization reference.

Frequency synchronization applications are only sensitive to the timing packet jitter (where the jitter can be only in the direction going from frequency master to slave in the case of a one-way approach being used, or in both directions where a two-way approach is used), whereas time synchronization always depends on packet timing jitter on both directions and in addition to that, it also depends on any asymmetry of the network as asymmetry causes time synchronization inaccuracy.

The absolute delay from a first end node to a second end node is not an issue as long as the total End-to-End delay is within the requirements of the specific application being used over that communications path (for instance in case of Radio Access Network connections, the time budget allocated to the access network is typically defined in the order of 20-30 ms).

Based on the above considerations, embodiments of the present invention propose to use an accurate, locally available, frequency reference (i.e. clock) that could be delivered via an external synchronization reference, such as that available when Synchronous Ethernet (SyncE) is used to connect respective network nodes, or that is available locally via a sufficiently stable local oscillator, to control the packet jitter and delay variation and preferably make it symmetric in both communication directions.

The packet delay variation control can be achieved by properly delaying all timing packets with a fixed latency, L, (this is preferably the same in both directions in the case of time synchronization, however when only frequency synchronization is distributed, L is not required to be the same on both directions). L can also be thought of as a form of predetermined network node transit time. This is to say, the method comprises delaying the output of timing packets from a network node until a predetermined duration of time, L, after receipt of the timing packet at the network node. Preferably, the delay should take into account the overall time budget available for the particular application of the connection across the network.

For example, in a mobile network, the latency, L, may be set to 1 ms, and still satisfy then 20-30 ms time budget. This assumes the number of hops between nodes in not excessive, i.e. the number of hops between a Packet Master and a Slave is expected to be typically lower than 10 hops and often actually being 5 to 6 hops at most. However, the fixed latency may be lower in actual implementations (e.g. 100-900 microseconds).

The same accurate locally available frequency may also be used to support the generation of a precise Time Stamp, where the precision of the Time Stamps is improved by sending them within timing packets sent out in pre-assigned time slots.

The proposed methods and apparatus are compatible for use with the IEEE1588 (or any other packet based methods, for instance based on NTP) timing standard implementations at node level, and they are also compatible for use with nodes that do not support IEEE1588 Boundary Clock/Transparent Clock implementations.

The proposed methods and apparatus are especially useful in the case of multi-operator environments, when in particular the implementation of the Boundary Clock may not be feasible.

The proposed methods and apparatus may implement any one or more of three separately effective timing optimisations described in more detail below, with reference to FIGS. 3 to 5.

Figure 3:
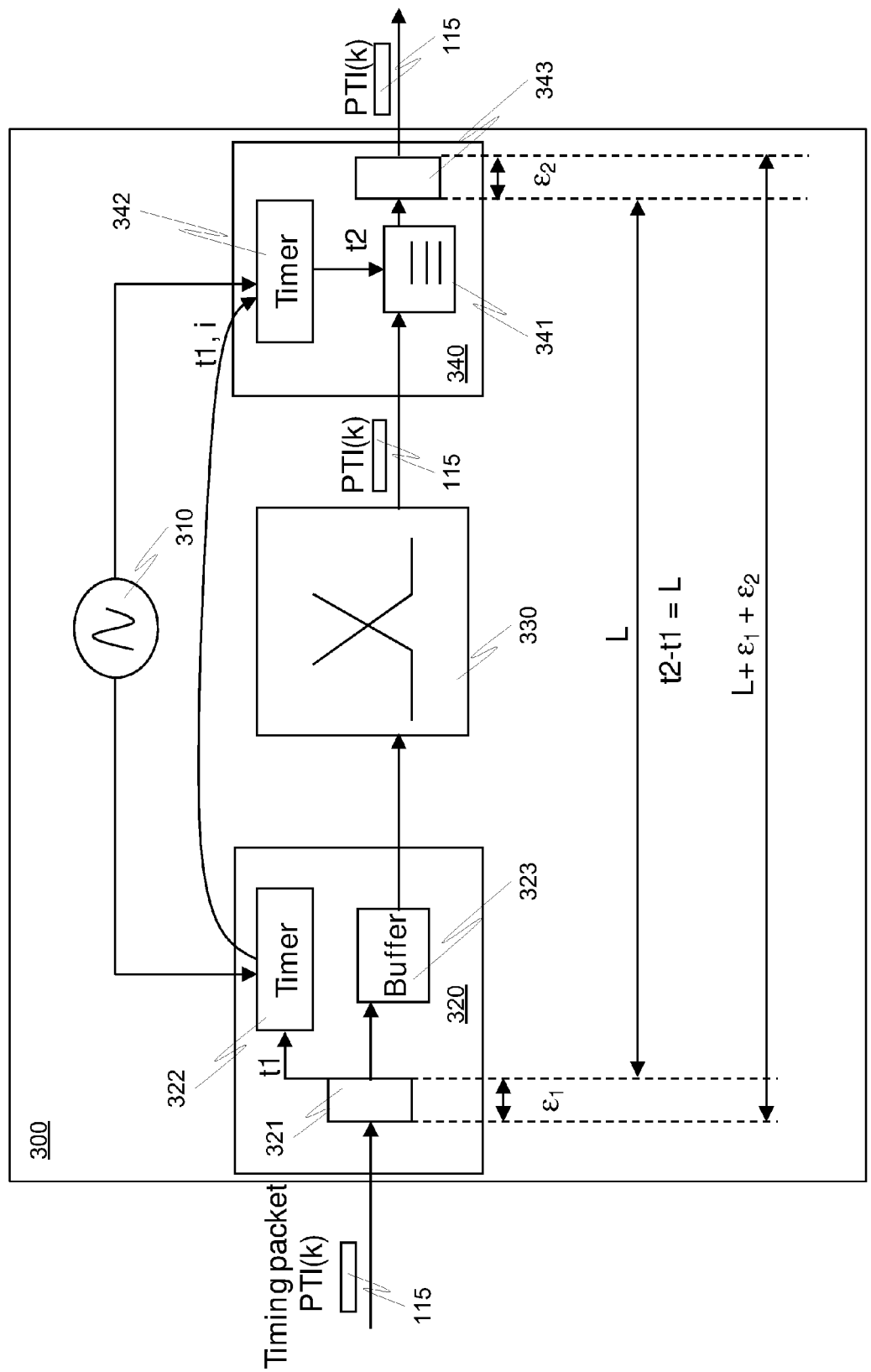
FIG. 3 shows a network node having controlled latency through the node according to an embodiment of the invention.

FIG. 3 shows how latency is controlled through a network node 300 according to an embodiment of the invention. The network node 300 comprises an input line card 320 connected to an output line card 340, via a backplane switching fabric 330.

The timing packets (e.g. timing packets PTI(k) 115) entering the input line card 320 are received by physical input circuitry 321, which triggers a timer 322 to start timing how long the timing packet 115 is in the network node 300 as soon as the input circuitry 321 recognises the incoming packet as a timing packet. The timer 322 is locked to the locally available accurate system clock 310 (available via, for example, Synchronous Ethernet or local stable oscillator). A small timing error, $\epsilon_1$, is unavoidable, as discussed in more detail below. The received timing packets 115 are then stored in an input buffer 323

The input buffer 323 outputs the timing packet 115 to the output line card 340, via the switching backplane 330. The timing packet 115 is then placed in an output queue 341 (preferably the highest priority output queue), ready for output from the network node 300 at an allotted time. An additional delay 343 is also present after the output queue 341, which represents additional delays that may occur to packets ready for sending (e.g. because the output line is busy sending other data packets at the allotted time of sending the timing packet, and the inherent, albeit very small, hardware processing delays).

An output line card timer 342 controls timing of events in the output card. It is assumed that the timers 322 and 342 in the various cards are phase aligned (e.g. via 1 pulse per second signal) with each other and the locally available system clock 310, and that the input timer 322 can pass on the input time, t1, to the output timer 342.

In order to provide the fixed network transit time (i.e. latency), the arrival time of the timing packet 115 at the input line card 320, t1, must be registered, and it should preferably be registered as close as possible to the physical layer (i.e. in hardware). A residual error, $\epsilon_1$, is unavoidable in the physical input circuitry due to hardware delays, however this is the same type of error that also gets introduced by any Boundary Clock or Transparent Clock in the network, as these two functions also register the arrival of the timing packets in a similar manner.

In any case, through suitable hardware implementation design, it is possible to limit this input arrival time residual sampling error, $\epsilon_1$, to a value in the order of nanoseconds, e.g. up to 100 ns. It shall be noted that the target accuracy indicated by the IEEE for hardware time-stamping is well below 100 ns. A sampling error in that length range would be an acceptable contribution to the overall time taken to process timing information, even for the most stringent of applications (e.g. mobile Time Division Duplex (TDD) systems require about 1.5 microsecond time accuracy).

The arrival time, t1, and the packet index i, are both forwarded to the output line card 340, particularly the output timer 342, at the same time as the timing packet 115 is sent on to the output line card 340 via the backplane interconnect 330. The packet is then scheduled to be sent out of the output line card 340 at time t2, where t2−t1=L. This is to say, time t2 is the exact time (within the available accuracy of the clock, see below for more details) that the timing packet starts to be outputted on an output line of the network node.

The delay L can be implemented in a number of ways, for example, the timing packet 115 can be stored in the input line card queue 321 for the fixed delay L (e.g. 1 ms) and then sent on to the output line card 340 for immediate output, or the input line card 320 can immediately forward the timing packet 115 to the output card 340, where it is delayed by L and then outputted.

It should be noted that the requirements on the timing reference 310 distributed to the network nodes for the generation of the timing packets 115, and on the internal delay variation for these timing packets when they are delivered towards the output line card 340, are not so strict, as long as the timing packets 115 are available at the output buffer 343 at a suitable time in advance before they must be delivered to the output port.

The internal transmission of the timing packet 115 across a network node 300 according to the present invention is also arranged to limit additional delays ($\epsilon_2$) caused by the output card 340 as much as possible (e.g. by utilising the highest priority output queue 341).

The main contribution to this error, $\epsilon_2$, is the queuing delay due to data packets already delivered on the same physical port of the network node 300, even if they are at lower priority.

In the case of high speed network ports (e.g. 10 Gbit/s), this queuing delay could be assumed to be sufficiently low, because data packets 125 are sent on quickly enough not cause much of a delay, e.g. a 500 bytes packet 125 being sent on the same output port as the timing packet 115 at 10 Gbit/s would at most generate a delay of $8 \times 500 \times 10^{-10} = 400$ ns which in some cases might still be acceptable (e.g. few nodes between the master and the slave).

Where lower speed interfaces are used, or where the above mentioned error applicable to high speed interfaces is not acceptable, some special logic can also be defined in order to further reduce this error, $\epsilon_2$, by making sure timing packets are sent in preference to long data packets (see further description below, with reference to FIG. 5).

By fixing the delay caused by the network node 300 in the forward (i.e. outgoing) direction, the forward timing packet jitter may be substantially reduced, thereby allowing any downstream timing circuitry (e.g. PLL oscillator) that synchronises to the sent timing packets to maintain an improved frequency accuracy. Preferably, though, the same fixed delay L may be imposed on the timing packets 115 crossing the network node 300 in the opposite direction (e.g. PTP Delay-Request related to the same timing connection), so that the backward timing packet jitter may be also substantially reduced (to the same degree as the forward timing packet jitter) which then provides the additional benefit of making the forward and backwards paths symmetrical, which is a key aspect that achieves accurate time and phase synchronization distribution. In the case where only frequency synchronization is required and a two-way protocol is used, L is not required to be the same on both directions.

The precision of L should preferably be <<1 microsecond, for example assuming that 50 ns is an acceptable error that can be added by each node, over a 10 ms period, the frequency accuracy of 5 ppm or better is required (this would give the 50 ns error).

Note that additional delays in the input line card ($\epsilon_1$), and output line card ($\epsilon_2$) shall be also taken into account (e.g. 100 ns).

The locally available stable frequency clock 310 may be derived from a synchronization based network, e.g. Synchronous Ethernet, or a stable local oscillator with at least the above described 5 ppm or better accuracy (if required it may also be controlled in the long term by the timing packets being sent). It is expected that in most mobile communication networks of the future Synchronous Ethernet will be available, especially in the network nodes deployed close to the Core network, where mobile network operators used to deploy SDH based synchronization networks, and/or where stand alone clocks controlled by GPS or Caesium are normally available.

Figure 4:
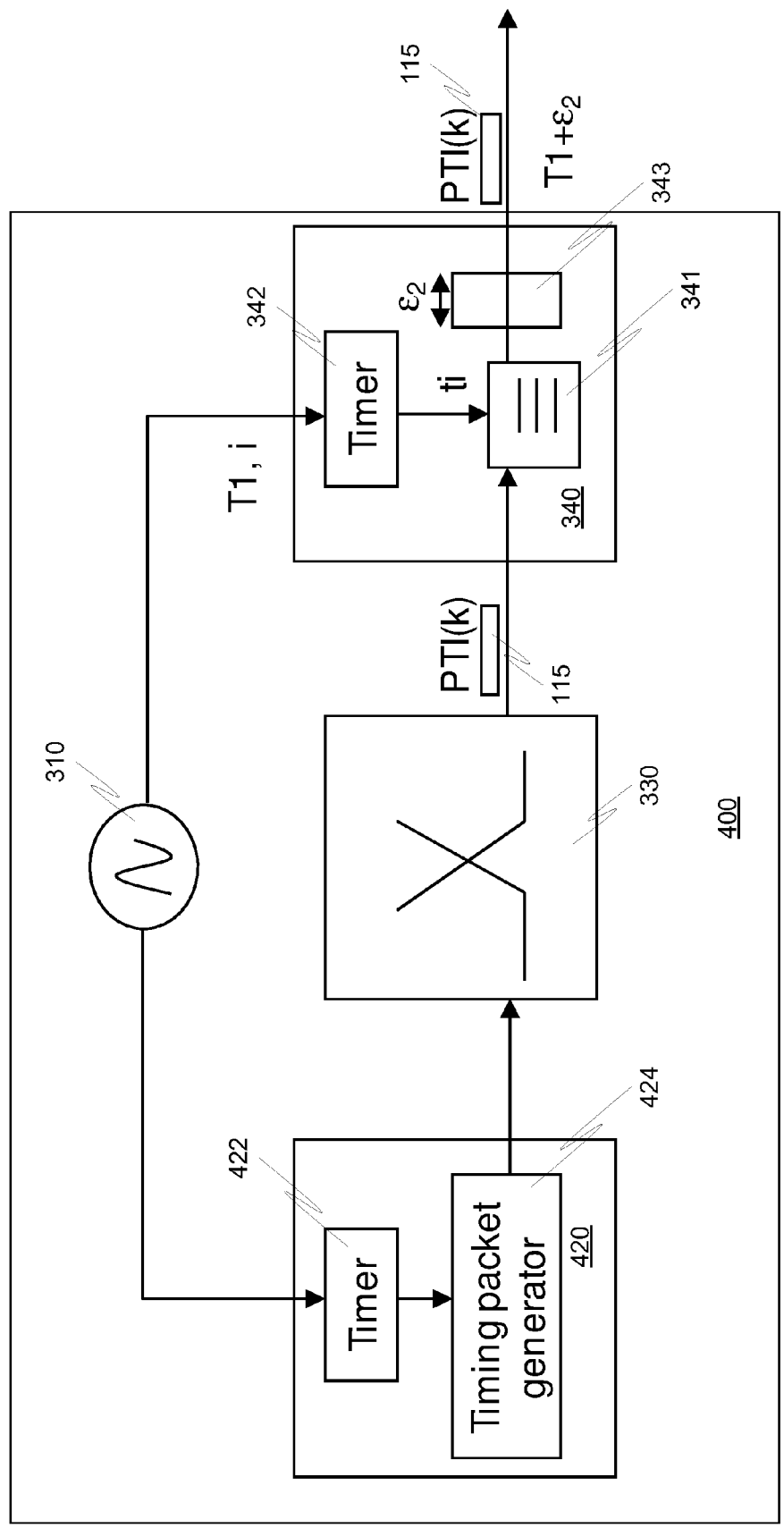
FIG. 4 shows an example of the output scheduler according to an embodiment of the invention.

FIG. 4 shows a special case where the Time Server (e.g. PTP Master) is available in the same network node 400, i.e. the network node in FIG. 4 does not pass timing packets from input line card to output line card—the input is a local Time Server. This, or similar, equipment could also provide a timing reference signal that can be connected to other network nodes with the above mentioned type of packet timing support. In this example, there is no input line card as such, as the timing packet is being generated locally in a Timing packet generation card 420, which includes a timing packet generator 424, as well as a timer 422, which operates in the same way as the timer 322 in the input line card 320 of FIG. 3.

The accurate frequency available, for instance from Synchronous Ethernet, could in this case be used to support a PTP master function by generating the outgoing timing packets (e.g. Sync packets) without the need for a two-step clock or hardware time-stamping. This can be done by delivering timing packets 115 on predefined instants based on the requested packet rate. The predefined instants may be periodic or aperiodic.

For instance, in case where the packet rate is 1/T, the outgoing timing packets 115 may be sent periodically at the predefined time instants (ti+T) and each timing packet can be prepared in advance, so that there is no timing packet generation processing delay.

The additional error $\epsilon_2$ on high speed links (e.g. 10 Gbit/s) is actually expected to be well below 1 microsecond, as discussed above.

In cases where long data frames are being used to communicate (e.g. jumbo frames), some additional functionality can be implemented in a network node according to embodiments of the invention, in order to avoid the situation where a timing packet 115 is delayed too much. This is especially of concern where lower speed interfaces (e.g. 1 Gb Ethernet) are used, as the sending out of jumbo data packets 125 may result in significant delay.

Where the time of delivery of timing packets is known, as discussed above, the output card is able to check whether it is possible to deliver a particular data packet 125 fully within the time remaining until the next predetermined timing packet delivery instance. If it is possible, the data packet 125 is sent. If it is not possible to send the data packet 125, then the network node can wait until the next timing packet 115 has been delivered before sending out the large data packet instead. Meanwhile, the method is further improved if the network node scans all other data packets 125 waiting in the respective queue for the port in use for sending the timing packets, and then sends any one or more of those data packets so long as their (combined) transmission time totals less than the time left remaining before the next predetermined timing packet instance.

This approach could be implemented via a traffic manager, where every timing packet 115 is associated with an "end transmission time" or with a "transmission time" label which can be used by the scheduler to decide at every processing cycle whether a data packet can be sent in order not to compete with the timing packets.

Figure 5:
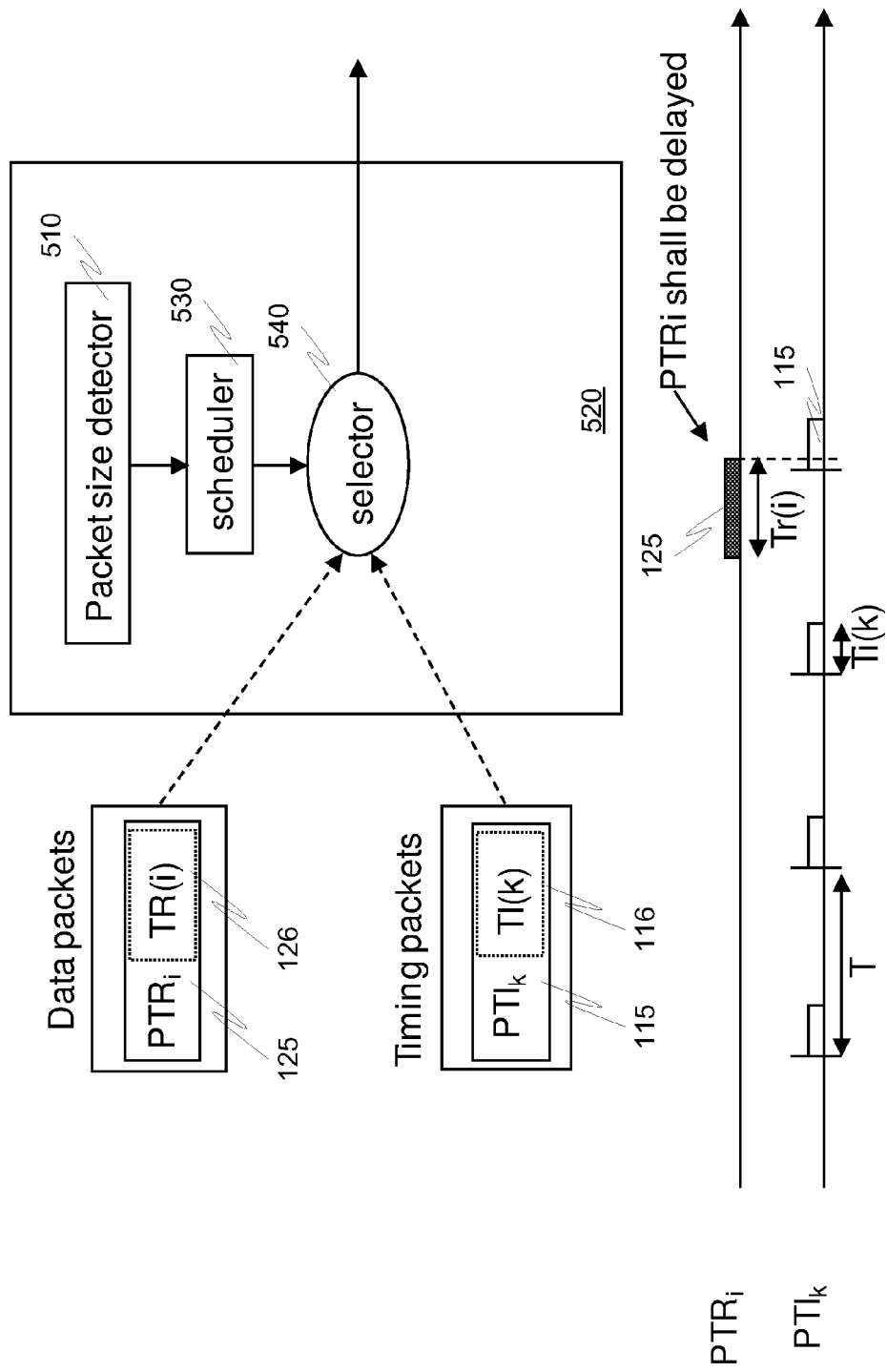
FIG. 5 shows precise time stamp generation by a master clock node according to an embodiment of the invention.

The use of a traffic manager 520 is shown in FIG. 5, in an example where a data traffic packet PTR(i) 125 has a label indicating that its total transmission time is TR(i) 126, and the next timing packet PTI(k) 115 has a label indicating that its total transmission time is TI(k) 116. The traffic manager 520 includes a packet size detector 510, which detects the size of data packets that are in the output queue ready for sending, a scheduler 530 to schedule the sending of data packets having suitable sizes (if at all), and selector 540 to select between the timing packet 115 or a suitable data packet 125.

The scheduler 530 can assess the transmission time labels 116 and 126, and if a collision is detected, the traffic manager 520 shall delay the transmission of the large data packet 125 until the timing packet 115 has been transmitted. In the example given, the traffic manager 520 also comprises a packet size detector 510 that is operable to read the packet labels which characterise the packet length, and inform the scheduler. The scheduler 530 can use the same packet label to determine the total transmission time for that data packet, if the speed of the network operation is known. The scheduler may incorporate the size detection instead of having separate entities. Either way, the scheduler can control the selection circuit 540 to select which packet (data, timing or other data packet(s) if short enough) to send out over the communication link output of the network node. The selection circuit 540 may comprise a multiplexer unit.

A final consideration is that the timing support described could be considered for a hybrid network, where some of the more important nodes in the network (e.g. especially those in the metro/core part of the network, typically operating at higher bit rates, e.g. 10 Gbit/s) have the described frequency and timing synchronization improvements implemented, while for less important network nodes closer to an end node, that may operate at lower rates, then the IEEE1588 timing functions (e.g. Boundary Clock) might be more appropriate. This is to say, a combination of IEEE1588 functions with the enhancements described could be considered where appropriate.

Such a hybrid network could allow to design an optimized support in some specific type of nodes (e.g. higher capacity), leaving the implementation of IEEE1588 clocks in smaller type of nodes, where it is expected that it will result in lower complexity.

The new frequency and timing synchronization improvements presented here are particularly useful for the transport network in the case of a multi-operator mobile communications environment, since a combination of the described features and IEEE1588 clocks would allow timing data delivery of high accuracy, especially when interworking between operators occurs. For example, in the case of an IEEE1588 Boundary Clock, in fact it would be too complex to deliver a service time which is different from the time of the network provider (i.e. the time of the network provider and of the owner of the timing service being distributed over the packet network would necessarily have to be synchronous).

In contrast, the proposed timing functions do not require the clock of the node to be synchronous with the timing packets crossing that node, since the node merely allows consistent passage of timing packets across the node, which ultimately does not interfere with what exact timing data they carry. In addition, embodiments of the present invention mean that the use of IEEE1588 Transparent Clock(s) (which violate layers, and is therefore not desirable to use in communications networks for fixed and/or mobile telephony/data due to security and privacy issues) may also be avoided.

Figure 6:
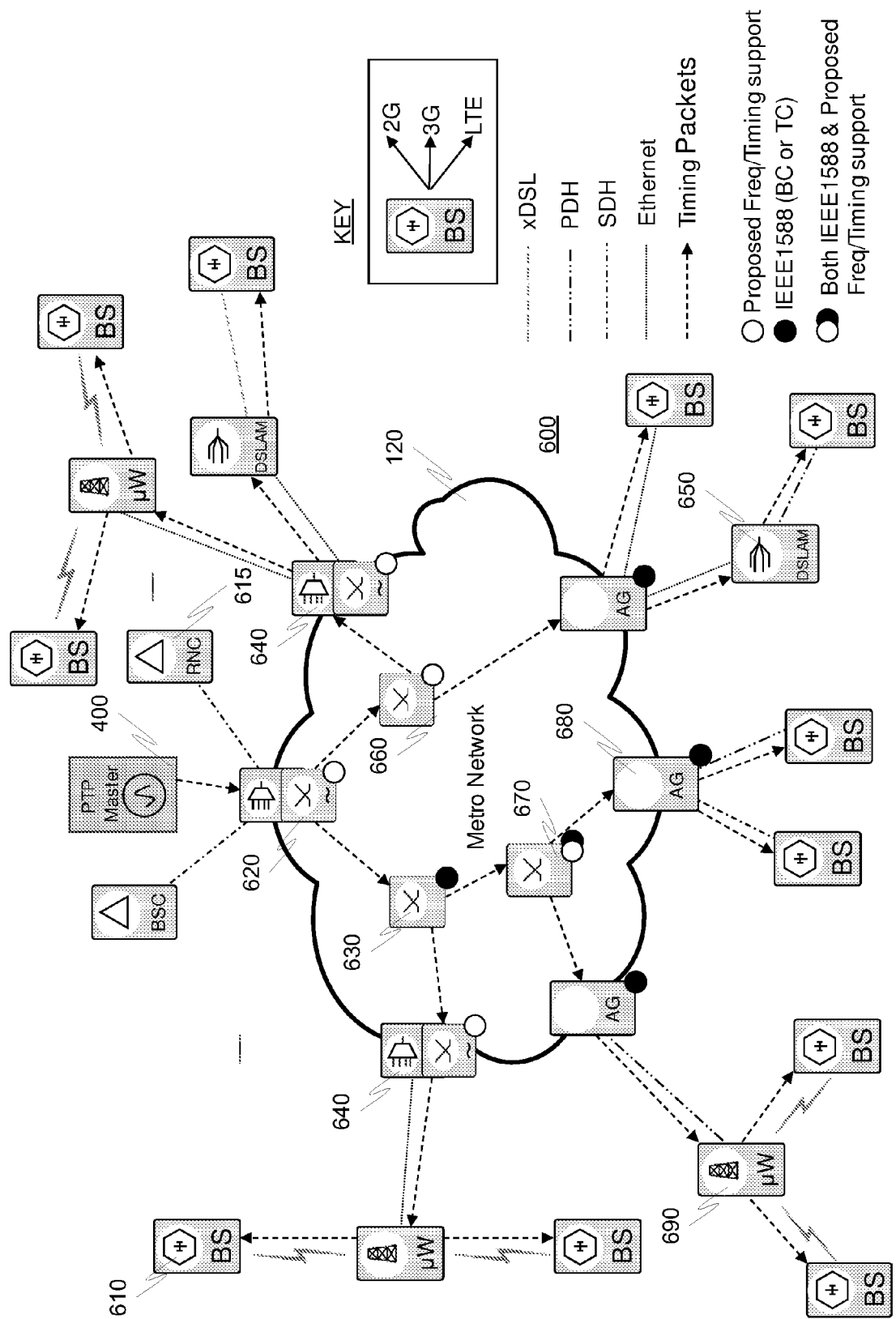
FIG. 6 shows an exemplary packet based mobile communications network scenario according to an embodiment of the invention.

FIG. 6 shows a possible hybrid mobile network architecture 600 incorporating network nodes of differing types, i.e.: according to the IEEE1588 standard (630, 680), embodiments of the present invention (620, 640) or both (670).

In FIG. 6, there is a core network 120, which carries data packets 125 and timing packets 115 for the mobile communications between handsets (not shown), or any other mobile communication device, attached to the network 600, via base stations.

For example, multiple standard (2G, 3G and Long Term Evolution) base-stations 610 are connected to the network nodes in the core network 120, via, for example, microwave links 690 or Digital Subscriber Line Access Multiplexer (DSLAM) 650. Also shown is a Radio Network Controller (RNC) 615, also connected to a node in the core network 120. The core network 120 comprises switches according to an embodiment of the present invention 660, switches according to another timing standard such as IEEE1588 630, and switches incorporating both IEEE1588 and an embodiment of the present invention, all interconnected between different edge nodes particular to their tasks (620, 640 and 680). The exact make up of the hybrid network is not important, only that the network comprises nodes of different types.

As an exemplary timing path within FIG. 6, timing packets are generated at a PTP master 400 (as described with reference to FIG. 4), and are then forwarded to the other nodes according to the present invention, e.g. edge node 640, via a switch not according to the invention 630.

As shown in the figure, the IEEE1588 traditional function could be reserved for smaller nodes closer to the access network. The timing functions proposed in this invention are suitable either as an alternative to the IEEE1588 clocks for some higher capacity nodes, or complementing the IEEE1588 clocks in order to provide the operator with flexibility when timing packets 115 from a different operator have to be carried with controlled packet delay variation, and is not possible to limit the PDV by means of IEEE1588 Boundary Clock or Transparent Clocks as described earlier. In any case, the result is a significantly reduced Packet Delay Variation on the timing packets to be processed by the slave.

Figure 7:
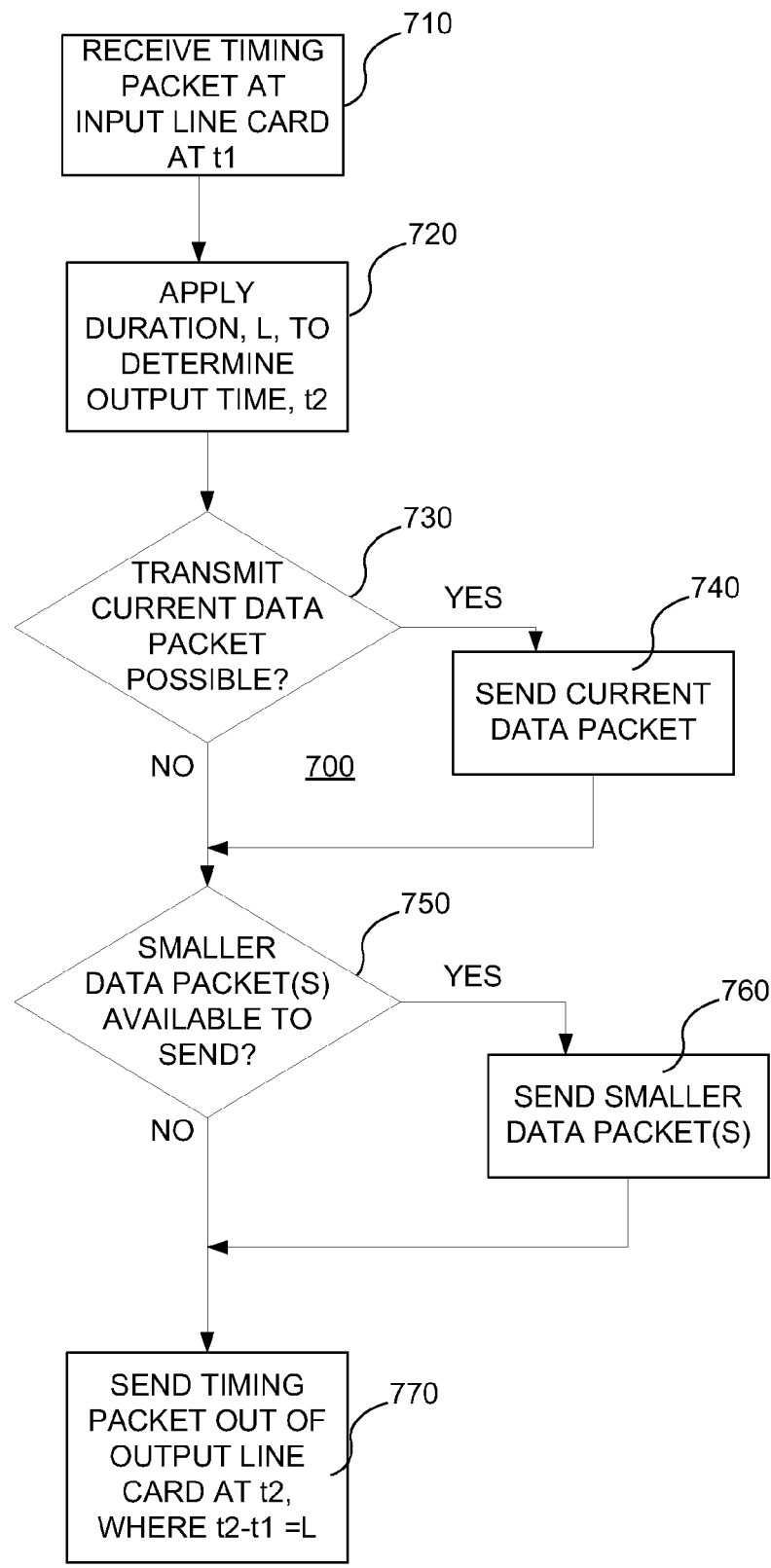
FIG. 7 shows a schematic block diagram of the method of optimising timing packet transport according to an embodiment of the invention.

FIG. 7 shows an exemplary portion of the method 700 according to an embodiment of the present invention, as it applies to a network node carrying timing packets derived from other timing sources (i.e. it relates to the embodiment of FIG. 3, and it does not cover the embodiment of FIG. 4 where timing packets are generated in the node itself). At step 710, an incoming timing packet 115 is received at an input line card at time t1. At step 720, a delay of predetermined length, L, is applied to the timing packet. At step 730, carried out during the delay, L, the network node checks whether the next data packet can be sent within the delay period, i.e. without affecting the sending of the timing packets at its allotted output time. If there is enough time, the next data packet is sent out at step 740. If there is not enough time available, then is it further checked at step 750 whether there is any other, smaller, suitable data packet available to send. Any available smaller data packet is sent out at step 760. This step 750, for checking if any smaller data packets are available to send in the remaining delay time, may be repeated. At step 770, the data packet is sent out of the network node at time t2, where t2−t1=L.

As an example of the effectiveness of embodiments of the present invention, where a prior art network node is operating at high speed, packets may have a packet delay variation of around a few hundred microseconds (i.e. the packet delay can vary between being a few microseconds to being a few hundred microseconds). Whereas, in high speed network nodes according to embodiments of the invention, the delay variation is reduced to around 150 ns (i.e. 100 ns input and output delay, $\epsilon_1$, $\epsilon_2$, and 50 ns clock accuracy delay, all as discussed in more detail above). This represents a several hundred fold decrease in (i.e. orders of magnitude less) Packet Delay Variation.

The above described method may be carried out by any suitably adapted or designed hardware forming a network node. The network node may be a router, switch, bridge router, repeating station or the like. Portions of the method may also be embodied in a set of instructions, stored on a computer readable medium, which when loaded into a computer, Digital Signal Processor (DSP) or similar, causes the computer to carry out the hereinbefore described method. However, for providing the most accurate frequency and/or timing synchronization, at least a hardware timing packet measurement unit, for determining timing packet arrival and departure times at the physical layer would be required.

Equally, the method may be embodied as a specially programmed, or hardware designed, integrated circuit which operates to carry out the described network synchronization methods when loaded into said integrated circuit. The integrated circuit may be formed as part of a general purpose computing device, such as a PC, and the like, or it may be formed as part of a more specialised device, such as a high speed carrier class router or switch, or the like.

An exemplary implementation would be a Field Programmable Gate Array (FPGA), programmed to carry out the above described method in hardware, said FPGA being a core component of a motherboard for a network node device.

Another exemplary hardware embodiment of the present invention is that of network node device, such as router or switch, embodied as one or more Application Specific Integrated Circuits (ASICs) mounted on a motherboard.

It will be apparent to the skilled person that the exact order and content of the steps carried out in the method described herein may be altered according to the requirements of a particular set of execution parameters, such as whether timing packet jitter and/or symmetry is required, and the like. Furthermore, it will be apparent that different embodiments of the disclosed apparatus may selectively implement certain features of the method in different combinations, according to the requirements of a particular implementation of the network as a whole. Accordingly, the claim numbering is not to be construed as a strict limitation on the ability to move features between claims, and as such portions of dependent claims maybe utilised freely.

The invention claimed is:

1. A method of optimising timing packet transport in a network node, the method comprising:
    using a locally available stable frequency reference at the network node to provide a pre-determined network node transit time for timing packets in at least one direction into or out of the network node;
    detecting an arrival time, t1, for a received timing packet;
    forwarding the received timing packet to an output port of the network node at a transmission time, t2, the transmission time t2 being a predetermined duration, L, after the arrival time t1;
    detecting a size of a data packet scheduled to be transmitted on a same output port as the timing packet; and
    delaying the transmission of the data packet if the size of the data packet indicates that transmitting the data packet would delay the transmission of the timing packet at the transmission time t2.

2. The method of claim 1, further comprising:
    receiving and storing the timing packet at an output queue following processing of the timing packet by the network node.

3. The method of claim 1, further comprising:
    selecting a highest priority output queue of the network node to transmit timing packets.

4. The method of claim 1, further comprising:
providing a pre-determined network node transit time for timing packets in both directions into and out of the network node.

5. The method of claim 1, further comprising:
determining whether any one or more other data packets available for transmission on the same output port has a size small enough to be transmitted within a remaining time before the transmission time t2 of the timing packet; and
transmitting the one or more other data packets.

6. The method of claim 1, wherein the locally available stable frequency reference is:
an external synchronization reference provided to the network node and operable to provide a global clock frequency; or
a stable local oscillator.

7. The method of claim 1, wherein the network node is in a network of nodes, wherein each network node is operable to transmit data to another network node or receive data from another network node, and wherein timing packets are transmitted from a first network node to a second network node via a path comprising hops between connected network nodes; and
wherein the pre-determined network node transit time, L, is chosen such that a time to transmit a timing packet from a first network node to the second network node is within a predetermined time budget, said time budget being dependent upon a particular application of communication within the network of nodes.

8. The method of claim 7, wherein the pre-determined network node transit time, L, is determined by a worst case scenario of a network node transit time for the particular network node in the path in either direction between first and second network nodes, said worst case scenario determined by a priori knowledge of the network node characteristics or during an initial communication between the first and second network nodes along a path to be used in subsequent communication between the first and second network nodes.

9. A network node comprising:
a locally available stable frequency reference;
circuitry adapted to apply a pre-determined network node transit time, L, to all timing packets transiting the network node in at least one direction into or out of a network node dependent on the locally available stable frequency reference;
input circuitry comprising at least one local timer in communication with the locally available stable frequency reference and adapted to register an input time, t1, for a received timing packet;
output circuitry comprising at least one local timer in communication with the locally available stable frequency reference and adapted to output the timing packet to an output port at time t2, determined by applying a predetermined duration, L, to the registered input time, t1;
data packet size detection circuitry adapted to detect a size of a next data packet to be transmitted out of the output port to determine whether the next data packet can be transmitted in full before the predetermined period of time, L, has expired; and
a scheduler unit adapted to schedule the transmission of the data packet after the transmission of the timing packet if the data packet cannot be transmitted in full before the predetermined period of time, L, has expired.

10. The network node of claim 9, further comprising:
an input buffer; and
wherein the output circuitry further comprises an output queue; and
wherein the input buffer and output queue are collectively arranged to store the timing packet for the predetermined duration of time, L.

11. The network node of claim 9, wherein the data packet size detection circuitry is further adapted to detect a size of any other data packet ready for transmission from the output port to determine whether any other data packet can be transmitted in full before the predetermined period of time, L, has expired; and
wherein the scheduler unit adapted to schedule the transmission of the any other data packet before the transmission of the timing packet if the determined size of any other data packet indicates the any other data packet can be transmitted in full before the predetermined period of time, L, has expired.

12. The network node of claim 9, further comprising:
a timing packet generator adapted to generate timing packets from the locally available stable frequency reference; and
wherein the network node comprises a master clock network node.

13. The network node of claim 9, wherein the output queue is a highest priority output queue.

14. The network node of claim 9, wherein the locally available stable frequency reference is:
an external synchronization reference provided to the network node and operable to provide a global clock frequency; or a stable local oscillator.

15. The network node of claim 9, wherein the circuitry is further adapted to apply a pre-determined network node transit time in both directions into and out of the network node.

* * * * *